Jan. 4, 1927.
N. A. CHRISTENSEN
1,613,021
BRAKE CONTROL VALVE
Original Filed April 17, 1925
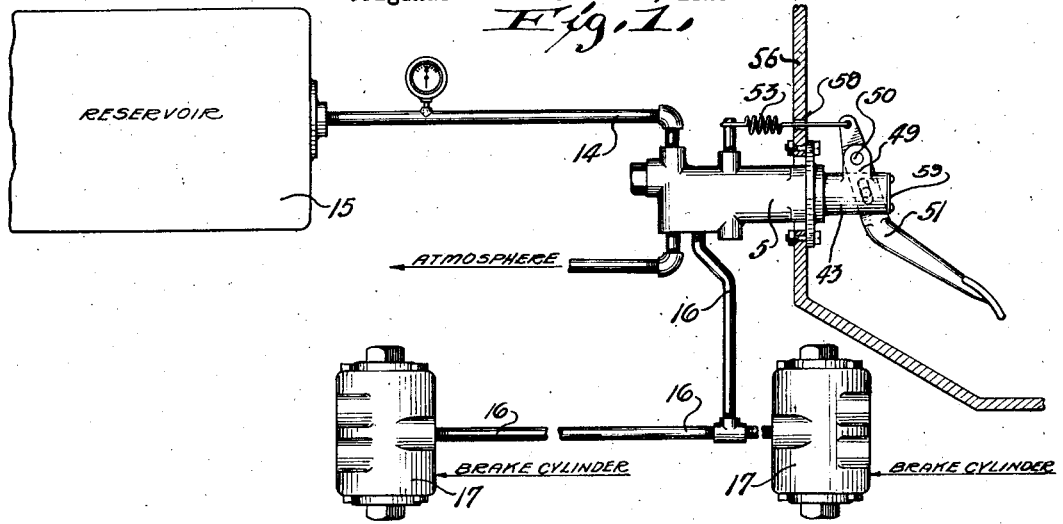
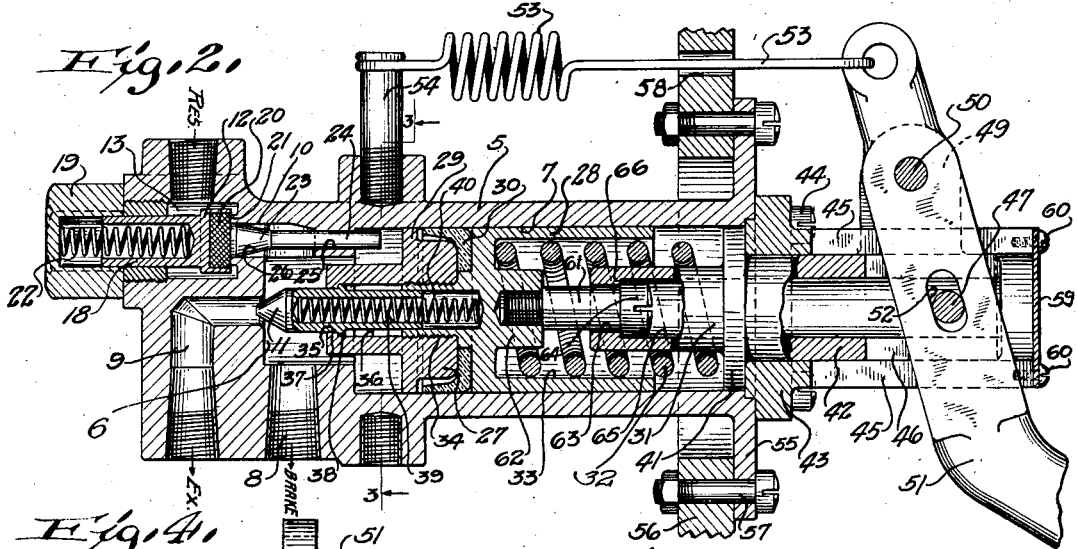
INVENTOR.
Niels A. Christensen
BY
Quarles & French
ATTORNEYS Patented Jan. 4, 1927.

1,613,021

UNITED STATES PATENT OFFICE.

NIELS A. CHRISTENSEN, OF CLEVELAND, OHIO.

BRAKE CONTROL VALVE.

Application filed April 17, 1925, Serial No. 23,847. Renewed October 19, 1926.

The invention relates to brake control valves more particularly adapted for use in connection with the fluid-pressure-operated brakes of automotive vehicles and trailers for such.

The object of this invention is to provide an improved control valve mechanism in which the braking pressure of the system may be readily controlled by the operator of the vehicle so that said pressure may be readily varied by the operator to secure the desired brake application pressure, the control being more particularly designed for foot operation, although not necessarily limited thereto.

The invention further consists in the construction and arrangement of parts hereinafter described and claimed.

In the drawings: Fig. 1 is an elevation view of brake-control-valve mechanism embodying the invention, showing it applied to an automotive vehicle;

Fig. 2 is a vertical sectional view of the valve mechanism embodying the invention;

Fig. 3 is a detail sectional view taken on the line 3—3 of Fig. 2;

Fig. 4 is a front end view of the valve mechanism, parts being broken away.

In the drawings the numeral 5 designates a valve casing having a space 6 formed therein, including a bore 7. A brake pipe passage 8, a valve-controlled exhaust passage 9 and a valve-controlled inlet passage 10 communicate with the space 6. A relief valve 11 controls the flow of air or other pressure fluid from the space 6 to the passage 9 and thence in a compressed air system to atmosphere, and an inlet valve 12 controls the flow of compressed air or other pressure fluid from a chamber 13 connected by a pipe 14 with the reservoir 15. The passage 8 is connected by any suitable piping 16 to the brake cylinders 17 associated with the wheels of the vehicle.

The inlet valve 12 has a tubular portion 18 slidably mounted in the bore of a box-nut 19 having threaded engagement with the casing, and has a head 20 of composition material inset therein and held against the seat 21 by a spring 22 mounted in the bore of the portion 18 and interposed between the end of said bore and the outer end of the bore in the nut 19.

A push-pin 23 is slidably mounted in the passage 10 and has a stem portion 24 mounted in a bore 25 formed in the casing. The head of this pin engages the head 20 of the inlet valve 12 and fits closely in the bore of the inlet passage with the exception of a wedge-shaped flat face 26 which gradually increases the effective port opening as this pin is pushed in toward the valve 12 by the application of the operating means.

A piston 27, formed of parts 28 and 29 and the flexible packing 30, works in the bore 7 and is moved in one direction by pressure transmitted to it from a plunger 31, by a spring 32, and in the opposite direction by fluid pressure acting against its inner end. The part 28 has a bore 33, in which the spring 32 seats, and a threaded tubular end portion 34. The part 29 has threaded engagement with the portion 34, whereby the medial portion of the packing disk 30 is clamped between said parts, and bores 35 and 36 alined with the bore in end portion 34, the bore 35 being of smaller diameter than the bore 36 to form a stop flange 37.

The relief valve 11 is in the form of a poppet needle-type valve having the conical head adapted to seat on the inner end of the passage 9 and having a tubular stem with a flange 38 and a bore 39. A spring 40 is mounted in the bore 39 and interposed between the end of said bore and the inner end of the bore in end portion 34, and said spring normally acts to move the valve 11 so that its flange 38 abuts against the flange 37. Thus the valve 11 is moved by and with the piston 27 through the pressure of the spring 40 and the piston 27 may also move relative to said valve when it seats. The valve 11 is not responsive to the air pressure in the space 6 to effect its opening, but its change in position is due directly to the position and movement of the piston 28.

The plunger 31 has a spring seating flange 41 working in the bore 7 and a cylindrical portion 42 guided in a tubular extension 43 secured to the casing 5 by screws 44, said extension having vertically disposed slots 45 therein. The end of the portion 42 of the plunger has also a slot 46 formed therein and carries a pin 47. Spaced lugs 49 are also provided on said extension, having a fulcrum pin 50 mounted therein. A foot-pedal or lever 51 is pivoted on the pin 50, works in the slots 45, and has a slot 52 through which the pin 47 passes. This lever, by means of a spring 53 secured to it and to a stud 54 mounted on the casing, is moved, with the plunger 31 associated with it through the pin and slot connection above described, to its outer position in which the spring 32 is relieved or substantially relieved of its tension. When, however, the operator presses down on the pedal 51 the plunger 31 is moved inwardly, putting a tension on the spring 32 which thereupon transmits its force to the piston 27, causing it to move inwardly.

The casing 5 is provided with a flange 55 for convenient mounting on the dash 56 of the vehicle by clamping bolts 57, and the spring 53 works through a hole 58 in the dash. The extension 43 has a cover plate 59 secured to it by bolts 60.

As shown in Fig. 2, the parts are in a non-application position, and it will be noted that the relief or exhaust valve 11 is open and that the stem of the operating pin 24 is spaced from the inner end of the piston at a greater distance than is necessary to cause the travel of said piston to seat the valve 11.

To make a brake application the operator presses down on the foot-pedal 51 and moves the plunger 31 inwardly, which, through the spring 32, causes an inward movement of the piston 27 and this in turn, through the spring 40, causes the exhaust valve 11 to be moved to its seat to close off the exhaust passage 9. Further inward movement puts pressure on the valve 11 through compression of the spring 40 and then causes the piston 27 to engage the pin 24 and move it to open the inlet valve 12, whereupon the compressed air from the reservoir flows from pipe 14, chamber 13, passage 10 to the space 6 and thence through passage 8 and pipes 16 to the brake cylinders 17. As the pressure in the brake system builds up the pressure in the space 6 in front of the piston 27 increases until it overcomes the pressure being exerted by the operator through the spring 32, and when said pressure exceeds the pressure of the spring 32 the piston 27 travels away from the stem 24 and the inlet valve closes and the parts are then in a "lap" position, since the piston travel is then not sufficient to relieve the pressure on the spring 40 to such an extent as to permit unseating of the valve 11, which, it will be noted, has a greater tendency to remain seated because of the pressure in the chamber 6 than to be opened, because of the differential areas of the seat and the valve. Thereafter release of the pressure on the spring 32 by the release of pressure on the foot-pedal will cause the piston 27 to travel outward, due to pressure exerted on it by the compressed fluid in the space 6, and when the flange 37 engages the flange 38 cause an opening of the release valve 11 and an exhaust of air from the brake system, or if further pressure is desired a further increase of pressure on the spring 32 by a greater movement of the pedal 51 will cause the piston 27 to move from the "lap" position heretofore noted to again engage the pin 24 and cause the inlet valve 12 to be again opened to admit more air from the reservoir while the relief valve remains closed.

Thus, the more the operator presses down on the brake pedal 51 the greater is the force stored up in the spring 32 and the greater the air pressure in the space 6 has to be to overcome this force to bring the valves to a "lap" position, so that the extent of braking pressure in the system is dependent upon the degree of movement of the lever 51 which is under the control of the operator who can thus regulate and control the amount of braking pressure he desires. As the spring 53 acts to return the lever 51 and plunger 42 to a release position, when the operator relieves the pressure therefrom the pressure on the spring 32 is released at a time when the piston 27 has been moved to such a position that the valve 11 is opened. To positively insure the movement of the piston 27 to a position in which the relief valve 11 is clear of its seat, I have provided also a connection between said piston and the operating member or plunger 31, consisting of a screw 61 having threaded engagement with a boss 62 on the part 28 and slidably mounted in a reduced bore 63 in the plunger 31 with its head 64 sliding in a bore 65 in said plunger and adapted to abut against a shoulder 66 formed by the bores 63 and 65 when the plunger 31 is moved outwardly by the spring 53 so that near the end of the movement of said plunger the piston 27 moves therewith. It will be noted that the screw 61 does not interfere with the movement of the piston 27 relative to the plunger 31 when the spring 32 is compressed.

Of course, it will be understood that the pin 24 may be formed integral with the valve 12.

I desire it to be understood that this invention is not to be limited to any particular form or arrangement of parts except in so far as such limitations are specified in the claims.

What I claim as my invention is:

1. In a vehicle-brake control valve, the combination of a casing communicating with the brake system and having inlet and exhaust ports, an inlet valve controlling the passage of motive fluid through said inlet port to said casing and brake system, an exhaust valve controlling the release of fluid from said casing and brake system through said exhaust port, a piston working in said casing for opening said inlet valve and responsive to the pressure in said casing, said exhaust valve being carried by and having a yieldable connection with said piston whereby the piston moves independently of said exhaust valve to open said inlet valve or to permit its closing when said exhaust valve is closed, and means under the control of the operator for varying the power of said piston to resist the pressure in said casing whereby to control the position and movement of said piston relative to said valves.

2. In a vehicle-brake control valve, the combination of a casing communicating with the brake system and having inlet and exhaust ports, an inlet valve controlling the passage of motive fluid through said inlet port to said casing, an exhaust valve controlling the release of fluid from said casing and brake system through said exhaust port, a piston working in said casing for opening said inlet valve and responsive to the pressure in said casing, said exhaust valve being carried by and having a yieldable connection with said piston whereby the piston moves independently of said exhaust valve to open said inlet valve or to a lap position when said exhaust valve is closed, and means including a spring under the control of the operator for varying the power of said piston to resist the pressure in said casing whereby to control the position and movement of said piston relative to said valves.

3. In a vehicle-brake control valve, the combination of a casing communicating with the brake system and having inlet and exhaust ports, a spring-closed inlet valve controlling the passage of motive fluid through said inlet port to said casing and brake system, an exhaust valve controlling the release of fluid from said casing and brake system through said exhaust port, a piston working in said casing for opening said inlet valve and responsive to the pressure in said casing, said exhaust valve being mounted in the front end of said piston, a spring between said piston and exhaust valve permitting movement of the piston relative to said valve when the same is closed whereby said piston may move to open said inlet valve or to a lap position, means for limiting the outward travel of said exhaust valve relative to the piston, and means including a spring under the control of the operator for varying the power of said piston to resist the pressure in said casing whereby to control the position and movement of said piston relative to said valves.

4. In a vehicle-brake control valve, the combination of a casing communicating with the brake system and having inlet and exhaust ports and a cylinder bore, a piston working in said cylinder bore and closing off the open end of the same, said piston being moved in an outward direction by the fluid pressure in said casing, a spring for resisting the movement of said piston by said pressure and for moving it in the opposite direction, a pedal-operated member under the control of the operator for transmitting force to said spring, a spring-closed valve controlling said inlet port and opened on the inward movement of said piston, a spring-pressed exhaust valve carried by the piston and movable relative thereto to permit said piston to open said inlet valve or move to a lap position when said exhaust valve is closed.

5. In a vehicle brake control valve, the combination of a casing communicating with the brake system and having inlet and exhaust ports and a cylinder bore, a piston working in said cylinder bore and closing off the open end of the same, a spring-closed inlet valve for said inlet port, a pin associated with said valve and adapted to gradually increase the effective inlet port opening upon the opening of said valve, said pin being engaged with said piston upon its inward movement, a spring-pressed exhaust valve carried by and movable relative to said piston for controlling said exhaust port, a spring acting in opposition to pressure in the brake system for moving said piston to open said inlet valve, and means under the control of the operator for varying the pressure of said spring.

6. In a vehicle brake control valve, the combination of a casing communicating with the brake system and having inlet and exhaust ports and a cylinder bore, a piston working in said cylinder bore and closing off the open end of the same, a spring-closed inlet valve for said inlet port opened by the piston, a spring-pressed exhaust valve for said exhaust port carried and closed by the piston, a member slidable in the open end of said bore, a pivoted foot-pedal for moving said member, and a spring interposed between said member and piston whose tension is varied by varying pressures applied to said foot-pedal by the operator.

7. In a vehicle brake control valve, the combination of a casing communicating with the brake system and having inlet and exhaust ports, a piston working in said casing, a spring-closed inlet valve for said inlet port opened by said piston, a spring-pressed exhaust valve for said exhaust port carried and closed by the piston, an operating member under the control of the operator, a spring interposed between said member and piston whose tension is varied by varying pressure applied by the operator, and a connection between said piston and member causing a positive outward movement of the piston with said member.

8. In a vehicle control valve, the combination of a casing communicating with the brake system and having inlet ports, an inlet valve for said inlet port, a piston working in said casing for opening said inlet valve, a spring-pressed exhaust valve carried by the piston and movable relative thereto to permit said piston to open said inlet valve or move to a lap position when said exhaust valve is closed, said piston being moved in an outward direction by fluid pressure in said casing, a spring for resisting the movement of said piston by said pressure and for moving it in the opposite direction, an operating member under the control of the operator for varying the pressure of said spring, means for moving said operating member to a release position, and means for moving said piston with said operating member as it moves to its release position.

9. In a vehicle control valve, the combination of a casing communicating with the brake system and having inlet and exhaust ports, an inlet valve for said inlet port, a pressure responsive member for opening said inlet valve, a spring-pressed poppet exhaust valve, for said exhaust port, carried by said member and movable relative to said member to permit said member to open said inlet valve or move to a "lap" position while exerting a closing pressure on said exhaust valve, said member being responsive to changes in pressure in the brake system, and means under the control of the operator for varying the action of said member under varying pressures in said casing whereby to control the position and movement of said member relative to said valves.

In testimony whereof, I affix my signature.

NIELS A. CHRISTENSEN